Sept. 17, 1940.                N. EISENSTEIN                2,214,738
                                NAILING MACHINE
                        Original Filed Jan. 7, 1936      4 Sheets-Sheet 1

INVENTOR
NATHAN EISENSTEIN
BY
ATTORNEYS

Sept. 17, 1940.   N. EISENSTEIN   2,214,738
NAILING MACHINE
Original Filed Jan. 7, 1936   4 Sheets-Sheet 2
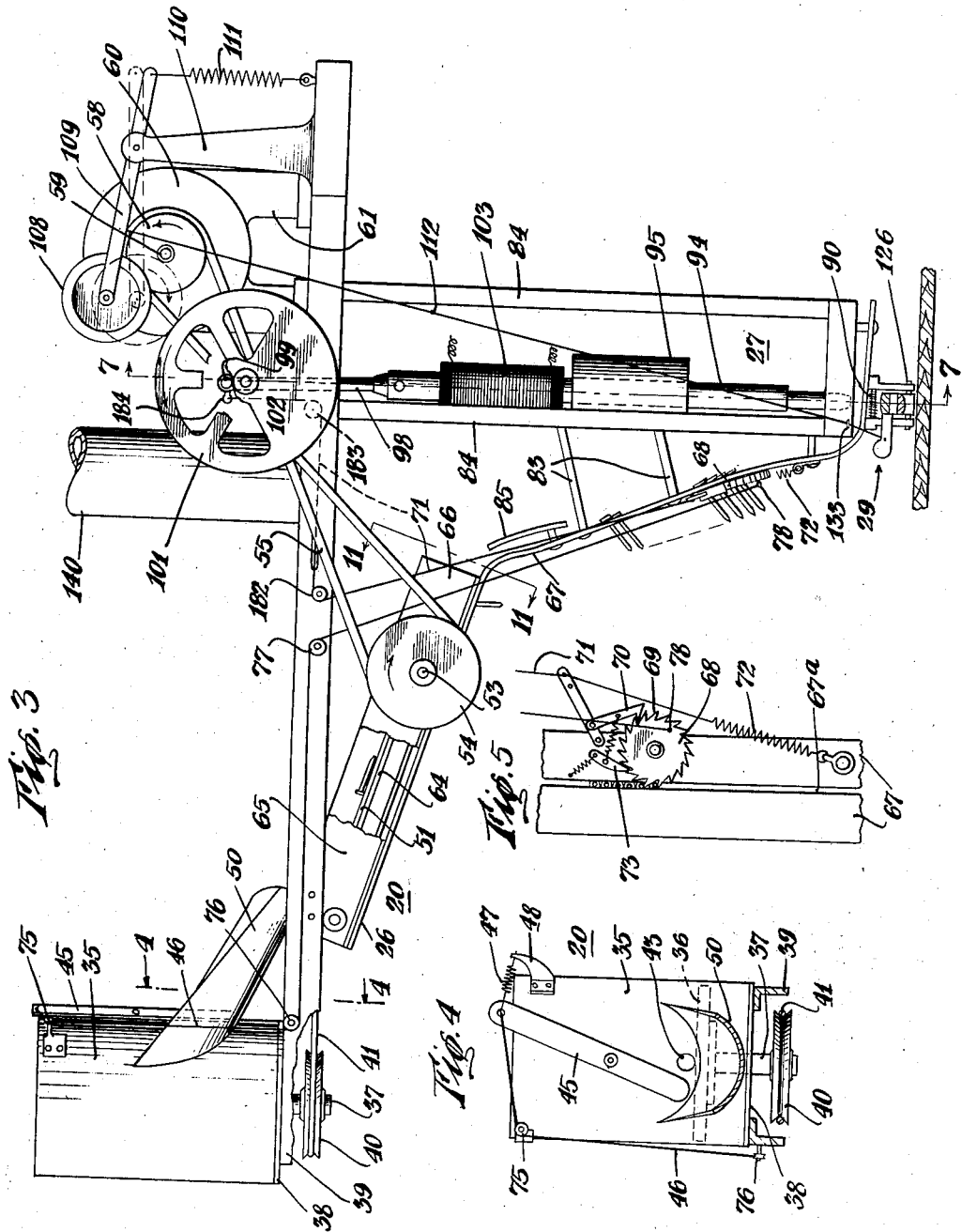
INVENTOR
NATHAN EISENSTEIN
BY Hauff & Garland
ATTORNEYS.

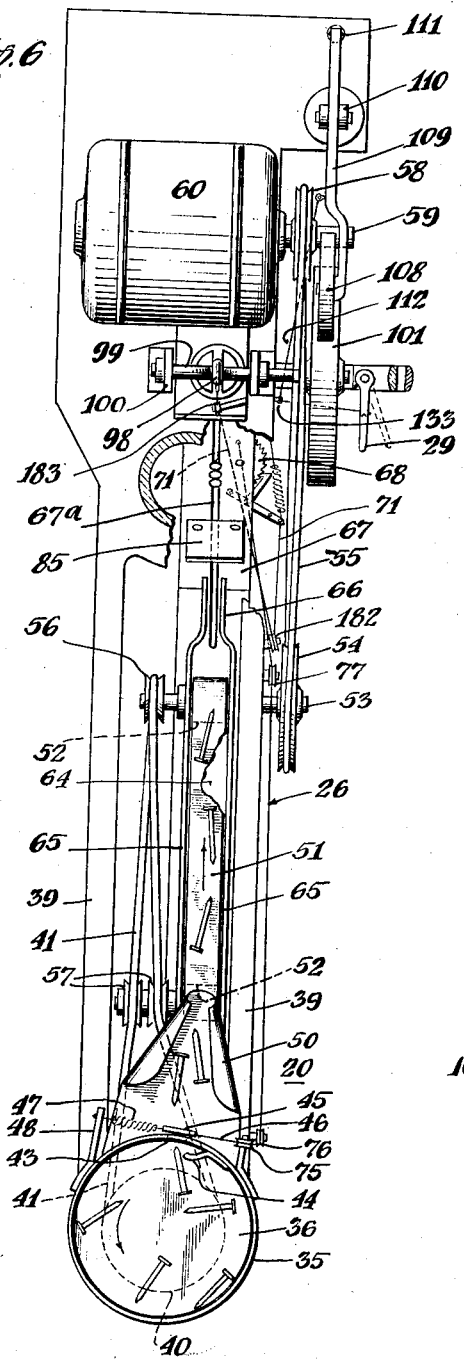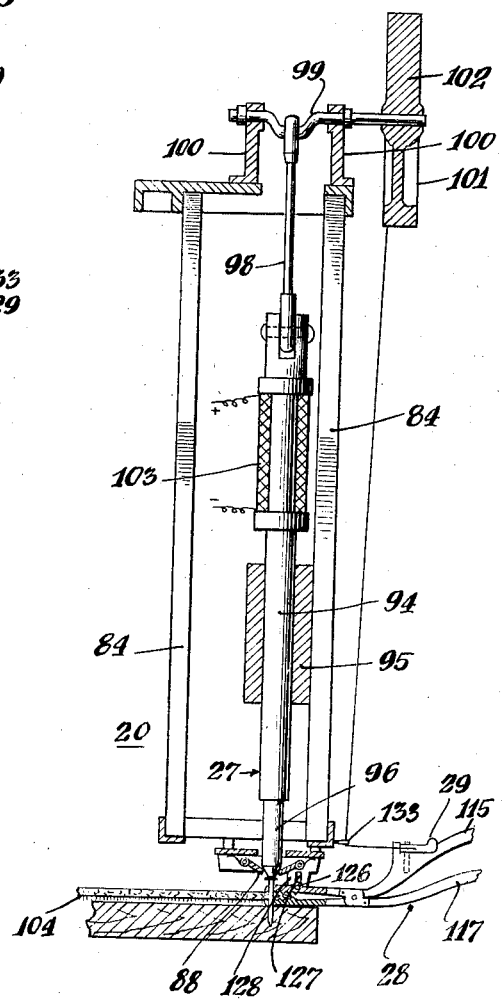

Sept. 17, 1940.  N. EISENSTEIN  2,214,738
NAILING MACHINE
Original Filed Jan. 7, 1936  4 Sheets-Sheet 4
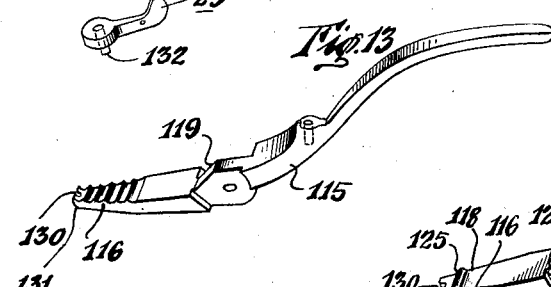
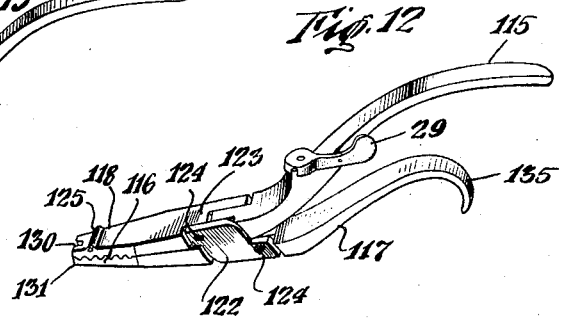
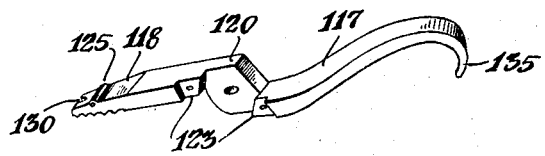
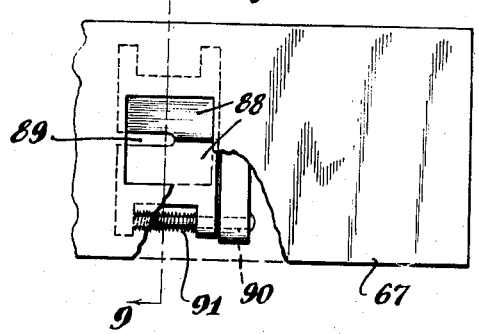
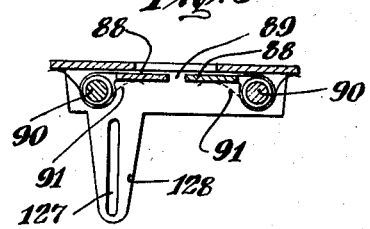
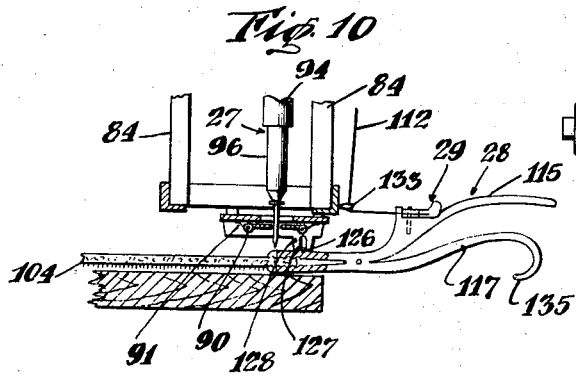
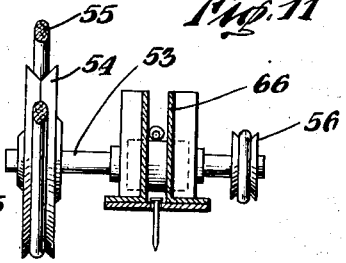
INVENTOR
NATHAN EISENSTEIN
BY *Hauff & Harland*
ATTORNEYS.

Patented Sept. 17, 1940

2,214,738

UNITED STATES PATENT OFFICE 2,214,738

NAILING MACHINE

Nathan Eisenstein, West Hempstead, Long Island, N. Y.

Application January 7, 1936, Serial No. 57,380
Renewed April 3, 1939

18 Claims. (Cl. 1—1)

This invention relates to automatic nailing machines, and more particularly to machines for stretching and nailing fur.

An object of the invention is to provide a machine of the above type which is simple and convenient to operate.

Another object is to provide a nailing machine which is adapted to automatically nail the fur to a board while leaving the hands free for stretching and guiding the fur.

Another object is to provide a combination stretching and nailing machine which automatically drives the nail at the proper location with respect to the pliers before the pliers are released from the fur.

Another object is to provide a machine of the above type having improved characteristics and which is capable of rapid operation.

Various other objects and advantages will be apparent as the nature of the invention is more fully disclosed.

A feature of the invention consists in the provision of a machine for automatically orienting and feeding nails to a power driven hammer. Fur stretching pliers are located adjacent the hammer in a position such that the nail is driven by the hammer at a point closely adjacent the ends of the pliers. Control means for the nailing mechanism is associated with the pliers in such a position that it may be operated without removing the hand from the pliers.

In one embodiment, the machine includes a hopper for feeding nails to a conveyor chute which is adapted to orient the nails and to feed the same to a point beneath a hammer. The hammer is mechanically operated by a crank and connecting rod and is associated with a magnet coil by which it may be magnetized for drawing the head of the nail against the hammer when the nail has been fed into position by means of the feeding chute.

The pliers are loosely secured to the frame of the machine with their jaws extending to a position adjacent the path of travel of the nail. A continuously operating motor is associated with the machine and an idler pulley is operated by means of a trigger secured to the pliers for establishing a driving connection between the motor and the hammer mechanism whenever it is desired to drive a nail. The hammer mechanism is so constructed that it is automatically brought to rest after each actuation with the hammer in raised position ready to receive the next nail. Feeding means associated with the feed chute is actuated in response to movement of the hammer so that a nail is automatically fed to the hammer after each actuation thereof and when the hammer is in raised position. Means is also provided to control the rate of feed of the nails in accordance with the requirements so as to prevent an undue accumulation of nails in the feeding mechanism.

Various other features and advantages will be apparent from the embodiment of the invention which is set forth by way of illustration in the following description and in the accompanying drawings forming a part thereof.

In the drawings:

Fig. 3 is a side elevation of the nailing machine;

Fig. 4 is a section taken on the line 4—4 of Fig. 3;

Fig. 5 is a detail view of the feed mechanism by which the nails are fed to the hammer;

Fig. 6 is a top plan view of the machine, showing the hopper, conveyor belt and driving mechanism;

Fig. 7 is a section taken on the line 7—7 of Fig. 3, showing the hammer in lowered position for driving the nail and showing the fur stretching pliers;

Fig. 8 is a detail view of the end of the feed chute;

Fig. 9 is a section taken on the line 9—9 of Fig. 8;

Fig. 10 is a broken view of the bottom of the hammer and the pliers, similar to Fig. 7, but showing the hammer in raised position with the nail magnetically held in contact therewith;

Fig. 11 is a section taken on the line 11—11 of Fig. 3.

Fig. 12 is a perspective view of the pliers;

Fig. 13 is a perspective view of the lower jaw of the pliers;

Fig. 14 is a perspective view of the upper jaw of the pliers;

Fig. 15 is a perspective view of the trigger for operating the hammer mechanism; and Fig. 16 is a perspective view of the hinge pin for the pliers.

Figure 1:
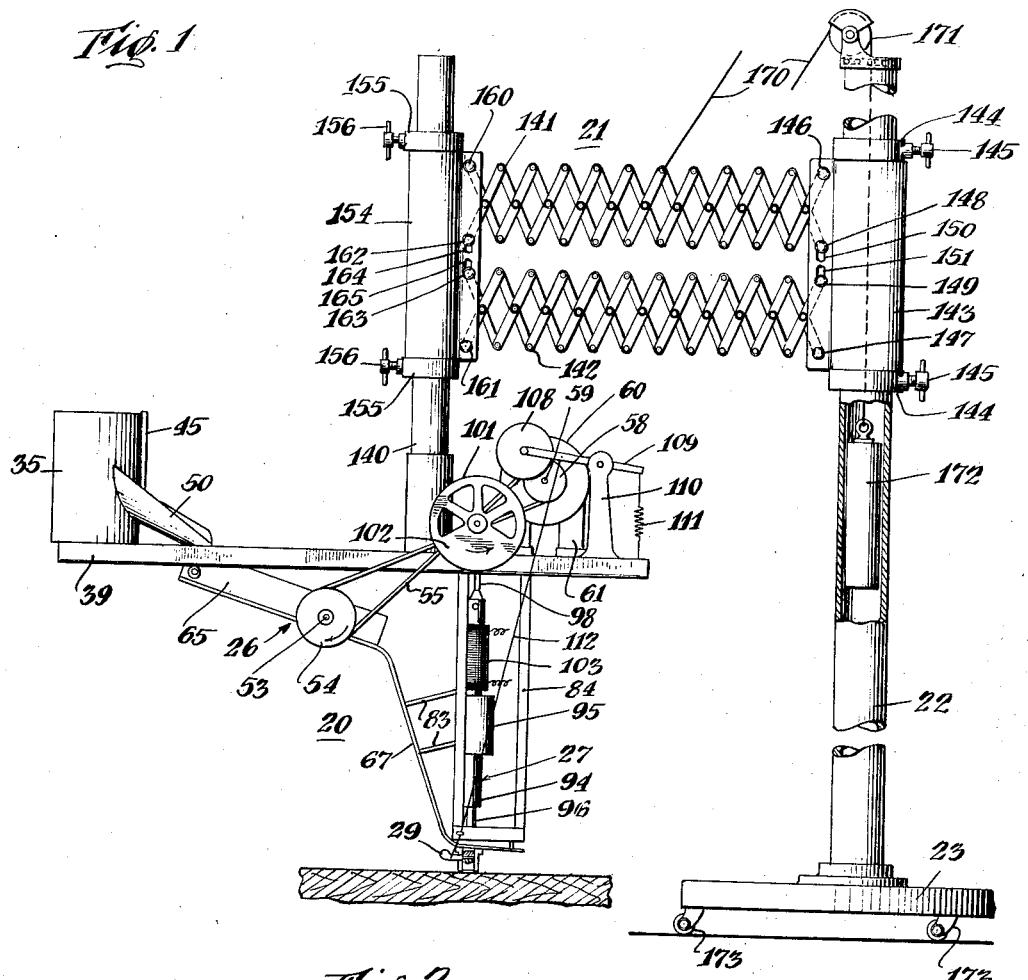
Fig. 1 is a side elevation of the nailing machine and support.

In the following description and in the claims certain specific terms are used for convenience in referring to various details of the invention. It is to be understood, however, that these terms are to be given as broad an interpretation as the state of the art will permit.

Referring more particularly to the drawings, the particular embodiment of the invention which is set forth for purposes of illustration comprises a nailing mechanism 20, (Figs. 1 and 3) supported by an expansible bracket 21 (Fig. 1), from a pedestal 22 which is mounted upon a suitable base 23 adapted to rest upon the floor.

The nailing mechine 20 comprises, in general, an orienting and feeding mechanism 26, a hammer 27, pliers 28 and a control trigger 29 by which the operation of the hammer is controlled.

Considering the above parts more in detail, the orienting and feeding mechanism 26 is shown as comprising a hopper 35 (Figs. 1, 3, 4 and 6), having a rotatable disc 36 forming the bottom thereof. Said disc is mounted on a spindle 37 (Fig. 4) which is suitably journalled in a plate 38 carried upon the frame 39 of the machine and upon which the hopper 35 rests. The spindle 37 carries a pulley 40 which receives a driving belt 41 (Figs. 2, 3 and 6) by which the disc 36 is driven.

The hopper 35 is provided with a discharge hole 43 through which the nails are discharged by centrifugal action due to the rotation of the disc 36. In order to prevent the nails from collecting at said discharge hole 43, a deflecting baffle 44 (Fig. 6) is mounted within the hopper 35 in advance of the discharge hole. This baffle serves to deflect the nails away from the discharge hole and to prevent piling up or jamming of the nails which would prevent or interfere with the normal operation of the machine.

In order to control the rate of discharge of the nails a pivoted gate 45 (Fig. 4) is provided, the lower end of which is adapted to be swung over the discharge hole 43, in response to the pull exerted by a flexible line 46. A spring 47, mounted between the gate 45 and a fixed ear 48 on the hopper 35, normally serves to hold the gate 45 out of register with the discharge hole 43. The line 46 is actuated when desired by mechanism to be described.

A stationary chute 50 is mounted adjacent the discharge opening 43 of the hopper 35, in a position to feed nails which are discharged through said opening onto a conveyor belt 51 (Figs. 3 and 6). The conveyor belt 51 constitutes an endless belt mounted upon rollers 52, which are journalled in flanges 65 secured to the frame 39.

A drive shaft 53 is associated with one of the rollers 52 and carries a driven pulley 54 actuated by a belt 55. The shaft 53 also carries a driving pulley 56 by which the belt 41 is driven. The belt 41 passes over a pair of idler pulleys 57, which are adapted to maintain the belt in proper position with respect to the driving pulley 56 and the driven pulley 40. The belt 55 is driven by a driving pulley 58 mounted upon the shaft 59 of a motor 60, which is supported by brackets 61 from the frame 39. The motor 60 may be operated by any suitable source of power, not shown.

The side flanges 65 are mounted on opposite sides of the conveyor belt 51 and extend above the top surface of the belt for guiding the nails therealong. The flanges 65 are bent to converge at their ends to form a discharge channel 66 (Fig. 6) which is of a proper width to pass only one nail at a time. A plate 64 may be extended between the flanges 65 immediately under the upper course of the belt 51 and for the entire length thereof to assist in the proper feeding of the nails. The flanges 65 may be secured to the frame 39 of the machine in a position such that the conveyor belt 51 receives nails from the end of the stationary feed chute 50.

The whole assembly is preferably mounted in an inclined position and discharges the nails through the channel 66 onto a feed chute 67 which may be secured at one end to the flanges 65. The conveyor may be operated at such a speed as to throw the nails leaving it into the discharge channel 66. The feed chute 67 is provided with a longitudinal slot 67a (Figs. 5 and 6) which is sufficiently wide to pass the shanks of the nails, but not to pass the heads of the nails. The nails which are discharged by the belt 51 onto this feed chute 67 are accordingly oriented thereby and are caused to slide down the chute 67 until stopped by a ratchet wheel 68. The ratchet wheel 68 is provided with teeth 69, which are so spaced that only one nail is received by each tooth. The wheel 68 is actuated by a pawl 70 which is controlled by a line 71 in response to actuation of the hammer mechanism to be described, and is normally held in operating position by a spring 72 (Fig. 5). A locking pawl 73 is held against the ratchet wheel 68, to cooperate with the pawl 70 for insuring step by step operation of the ratchet wheel so as to feed one nail at each actuation of the pawl 70.

The line 46 controlling the gate 45 passes over idler pulleys 75, 76 and 77 (Figs. 3 and 4) and is attached to a pin 78 carried by the ratchet wheel 68 (Figs. 3 and 5). The connection is such that the gate 45 is caused to cover the discharge hole 43 during a part of a revolution of the ratchet wheel 68 and to uncover said discharge hole during the remainder of each revolution of said ratchet wheel, thereby periodically shutting off the feed of the nails so as to prevent an undue accumulation thereof in the chute 67, adjacent the ratchet wheel 68.

The chute 67 is supported upon brackets 83 from a frame 84, depending from the frame 39, above mentioned, and adapted to support the hammer mechanism to be described. The chute 67 is curved downwardly to feed the nails received from the conveyor belt 51 to a point below the frame 84. A plate 85 may be mounted adjacent the chute 67, at the upper portion thereof to guide the heads of the nails and to insure the proper position thereof in the slot 67a.

The lower end of the chute 67 has secured thereto a pair of gates 88, having a slot 89 formed therein (Figs. 8 and 9) which is in alignment with the slot 67a above mentioned and receives the shank of the nail. The slot 89 terminates at an intermediate point in the gates 88, which is adapted to properly position the nail under the hammer head to be described. The gates 88 are mounted upon shafts 90 and are normally held in closed position by means of springs 91. The gates, however, are adapted to be opened, as indicated in Fig. 7, to permit the nail to be driven therethrough by the hammer head.

The hammer mechanism comprises a shaft 94 (Fig. 7) journalled in a bracket 95 secured to the frame 84 and carrying a hammer head 96 in a position adapted to engage the head of the nail which is held in the slot 89 of the gate 88 (Figs. 7 and 10). The shaft 94 is connected, by means of a connecting rod 98, to a crank shaft 99, journalled in brackets 100 carried by the frame 39, and carrying a drive pulley 101, which is suitably weighted, by a counterweight 102 (Fig. 3), to cause the pulley to come to rest with the crank shaft 99, the shaft 94 and hammer head 96 in raised position. Any suitable means may be provided for adjusting the length of the connecting rod 98. A magnet coil 103 is carried upon the shaft 94 for magnetizing the shaft and the hammer head 96, so that the hammer head 96 is caused to attract the nail and to hold the nail in proper position above the fur 104, which is being stretched (Fig. 10).

For actuating the hammer mechanism, there is provided an idler pulley 108, carried upon an arm 109 which is mounted upon a bracket 110 secured to the frame 39. The idler pulley 108 is adapted to engage the shaft 59 of the motor 60 and the drive pulley 101 for establishing a driving connection between said shaft and pulley. The idler pulley 108 is normally held out of engagement with said shaft and drive pulley by means of a spring 111 and is adapted to be pulled into engagement with said shaft and drive pulley by means of a line 112, which is actuated by the control trigger 29 to be described.

The fur stretching pliers 28 are illustrated in Figs. 12 to 16, as comprising a member 115 carrying a lower jaw 116, and a member 117 carrying an upper jaw 118. The members 115 and 117 are provided with bearing sections 119 and 120 respectively, which are adapted to receive a hinge pin 121. The hinge pin 121 is carried by or may be integral with a plate 122 (Fig. 16) which is adapted to be secured by screws 124 to shoulders 123, formed on the member 117, for locking the pin in position. The pliers are thus detachably assembled in such manner that one of the members 115 or 117 may be readily replaced in the event of damage thereto.

The member 117 carries a boss 125 near the upper jaw 118. This boss is adapted to receive a pin 126 (Figs. 3, 7 and 10), which is slidably held in slots 127 (Figs. 7, 9 and 10) formed in brackets 128 attached to the lower end of the chute 67, adjacent the gates 88. The slots 127 are so positioned as to allow free vertical movement of the pliers for operating the same to grip the fur or to permit the jaws to pass over the nail head when the nail has been driven. The gates are so spaced with respect to the pliers to permit the nail coming to the end of the slot 89 to clear the pliers.

A vertical notch 130 is formed in the upper and lower jaws 116 and 118 of the pliers, in alignment with the path of travel of the nail, and the pliers are so held by the pin 126 that the nail is caused to be driven through this notch, and consequently nearer than heretofore possible to the outer edge of the fur when the hammer mechaniism is operated.

The forward portion of each of the jaws 116 and 118 may preferably be tapered so as to have the narrowest width adjacent the aligned vertical notches 130 as shown at 131, so that the nails can be closely spaced.

The control trigger 29 (Figs. 12 and 15) is secured to the member 115 as by a pin 132. The line 112 above mentioned, passes from the arm 109 through an idler pulley 133 and thence to the control trigger 29 to which it is secured, the arrangement being such that movement of the trigger produced, for example, by the thumb, is caused to pull the idler pulley 108 into engagement with the shaft 59 and with the drive pulley 101 for causing actuation of the hammer mechanism.

The member 117 is preferably bent upwardly so as to provide clearance for the table and may be formed with a curved end 135 to facilitate gripping the same by the hand and releasing the same upon straightening the fingers of the hand.

The support for the nailing machine comprises a standard 140, which is secured to the frame 39 in any convenient manner, and is carried by the expansible bracket 21 which is in turn carried by the pedestal 22.

The expansible bracket 21 comprises a pair of expansible members 141 and 142, attached to a yoke 143 which is journalled on the pedestal 22, and is secured at any desired elevation by means of collars 144. The collars 144 may be adjustably attached to the pedestal 22 by means of set screws 145. The yoke 143 is free to turn about the pedestal 22, but is held at a fixed elevation by said collars 144. The expansible members 141 and 142 are secured to the yoke 143 by means of fixed pivots 146 and 147 and by pins 148 and 149 which engage slots 150 and 151 in the yoke 143.

The expansible members 141 and 142 are secured to the standard 140 in a similar manner, namely by a yoke 154, which is journalled on said standard and is held between the collars 155 which are attached to the standard 140 at the desired elevation by set screws 156. The expansible members 141 and 142 are attached to the yoke 154 by fixed pivots 160 and 161 and by pins 162 and 163 engaging slots 164 and 165 respectively in said yoke. The construction is such that the members 141 and 142 may be extended without changing the elevation of the standard 140.

It is obvious that various other types of expansible brackets may be used. One particular type has been set forth merely for purposes of illustration.

In order to counteract a portion of the weight of the nailing machine, a cable 170 may be attached to any suitable point on the expansible member 141 and may pass over a pulley 171 and engage a counterweight 172 which is adapted to slide in the pedestal 22.

The base 23 of the pedestal 22 is provided with suitable castors 173 to permit the same to be readily moved over the floor.

While a specific embodiment of the invention has been described, it is to be understood that various changes and substitutions may be made therein as will be apparent from the following description of the operation of the machine.

Figure 2:
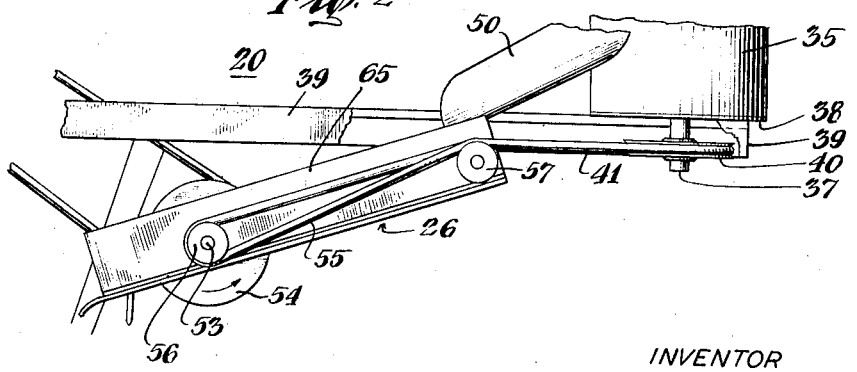
Fig. 2 is a detail view of the driving means for the nail feed mechanism.

In order to stretch and nail a fur to a table so as to conform to a predetermined pattern, the machine is swung into proper position over the table as indicated in Fig. 1, by first moving the entire machine including the pedestal 22 and base 23 and then adjusting the yokes 143 and 154 with respect to the pedestal 22 and standard 140, so as to bring the machine to the proper elevation over the table. The machine is then free to be moved laterally by expansion or compression of the members 141 and 142 and may be turned in different directions by reason of the pivotal connection of the yokes 143 and 154 to the pedestal 22 and the standard 140 respectively.

The nails in the hopper 35 are caused, by rotation of the disc 36, to be ejected from the discharge hole 43 whereupon they slide down the chute 50 onto the conveyor belt 51 by which they are oriented and discharged through the channel 66 onto the chute 67. The shank of each nail then falls through the slot 67a in the chute 67 and the nails are progressively fed, as indicated in Fig. 3, to the ratchet wheel 68. Previous actuation of the ratchet wheel in the manner to be described, has already fed one of the nails past the ratchet wheel and to the slot 89 in the gates 88, under the hammer head 96. The hammer head being magnetized by the magnet coil 103, causes the nail to engage the same and to be elevated the necessary distance above the fur 104.

With the machine positioned as described above, the pliers 28 are caused to grip the edge of the fur 104 as indicated in Fig. 10 and the fur is pulled in the usual way by means of the pliers until it has been stretched to the desired point. Thereupon the trigger 29 is pressed by the thumb of the hand gripping the pliers and is caused to actuate the line 112 for pulling the idler pulley 108 into driving engagement with the shaft 59 and with the drive pulley 101 so as to actuate the hammer.

The application of power to the pulley 101, caused by actuation of the trigger 29, causes rotation of the crank shaft 99 and reciprocation of the hammer head 96. The hammer head, in descending, forcibly opens the gates 88 and drives the nail through the fur 104 into the table, as shown in Fig. 7. Further movement of the pulley 101 again elevates the hammer head into the position shown in Fig. 10. After the edge of the fur 104 is thus nailed to the table, the pliers may be released for gripping the fur in another place for repeating the operation.

The counterweight 102, causes the hammer head to come to rest in an elevated position. A slight actuation of the trigger 29 is thus sufficient to cause one operation of the hammer and to drive one nail in the manner above described.

Rotation of the pulley 101 and of the crank shaft 99 operates to feed the next nail to the gates 88 in the following manner. The line 71, which actuates the pawl 70, passes over pulleys 182 and 183 (Fig. 3) and is secured to a lug 184 carried by the connecting rod 98. The reciprocation of the connecting rod accordingly actuates the pawl 70, the arrangement being such that each actuation of the pawl advances the ratchet wheel 68 a sufficient distance to release one nail. It is evident, therefore, that momentary actuation of the trigger 29 suffices to drive a nail into the fur at a point adjacent the end of the pliers and to feed the next nail into position under the hammer. It is to be understood that the ratchet wheel 68 is actuated on the return movement of the hammer so that the nail is fed when the hammer is in raised position.

It is to be noted that in the apparatus above described the gate 45 is closed during a part of the rotation of the ratchet wheel 68 so as to interrupt the nail feed and prevent excessive accumulation of nails in the slot 67a. Obviously, this gate may be omitted if it is not required or the relative time of actuation may be varied to suit the particular requirements by altering the length of the line 46 or the position of the pin 78 on the ratchet wheel 68.

The magnet coil 103 is preferably continuously energized.

Obviously, the idler pulley 108 may be replaced by any other suitable mechanism for intermittently actuating the drive pulley 101 in response to pressure on the trigger 29. Furthermore the specific mechanical arrangement of the parts may be altered in various ways as may be apparent to a person skilled in the art. Only so much of the mechanical details have been set forth as is necessary to a complete understanding of the invention.

A specific embodiment has been shown for purposes of illustration only. It is to be understood, however, that the invention is not to be limited thereto, but is only to be limited in accordance with the scope of the following claims when interpreted in view of the prior art.

What I claim is:

1. In a machine for stretching and nailing material, in combination, pliers adapted to grip the edge of the material and a nailing machine associated therewith, said nailing machine comprising a frame carrying a vertically movable hammer head, means for actuating said hammer head including a drive pulley, a continuously operating motor having a shaft, an idler pulley and means to periodically bring said idler pulley into driving engagement with said shaft and with said drive pulley.

2. A nailing machine comprising a frame carrying a vertically movable hammer head, nail feeding means for feeding a nail in proximity to the hammer head each time the hammer head is in raised position, means for actuating said hammer head including a hammer actuating drive shaft, a continuously operating motor having a shaft and means to make periodic driving connection between said motor shaft and said hammer actuating drive shaft and for causing a single actuation of said hammer head whereby a separate nail is driven at each actuation of the hammer head.

3. A nailing machine comprising a frame carrying a vertically movable hammer head, nail feeding means for feeding a nail in proximity to the hammer head each time the hammer head is in raised position, means for actuating said hammer head including a hammer actuating drive shaft and eccentric, a connecting rod, a continuously operating motor having a motor shaft, and means to make periodic driving contact between said motor shaft and said hammer actuating drive shaft and for causing a single actuation of said hammer head whereby a separate nail is driven at each actuation of the hammer head.

4. A nailing machine comprising a frame carrying a vertically movable hammer head, and nail feeding means for feeding a nail in proximity to the hammer head each time the hammer head is in raised position, means for causing reciprocation of said hammer head comprising a hammer actuating drive shaft and eccentric, a connecting rod, a continuously operating motor having a motor shaft, a clutching or engaging mechanism adapted for driving engagement between the motor shaft and the hammer drive shaft and means for periodically bringing the clutching or engaging mechanism into driving engagement with the motor shaft and the hammer actuating drive shaft and for causing a single actuation of said hammer head whereby a separate nail is driven at each actuation of the hammer head.

5. In a machine for stretching and nailing material, in combination, pliers adapted to grip the edge of the material and a nailing machine associated therewith, said nailing machine comprising a frame carrying a vertically movable hammer head, means for causing reciprocation of said hammer head comprising a crank shaft, connecting rod and drive pulley, a continuously operating motor having a shaft, an idler pulley and means to periodically bring said idler pulley into driving engagement with said shaft and with said drive pulley.

6. In a machine for nailing material, pliers adapted to grip the material and a nailing machine associated therewith, said nailing machine comprising a frame carrying a vertically movable hammer head, and means for causing reciprocation of said hammer head comprising a hammer actuating drive shaft and eccentric, a connecting rod, a continuously operating motor having a motor shaft, a clutching or engaging mechanism adapted for driving engagement between the motor shaft and the hammer drive shaft and means for periodically bringing the clutching or engaging mechanism into driving engagement with the motor shaft and the hammer actuating drive shaft, and means associated with said pliers in a position to be actuated without removing the hand therefrom for controlling the position of said clutching or engaging mechanism.

7. In a machine for stretching and nailing material, in combination, pliers adapted to grip the edge of the material and a nailing machine associated therewith, said nailing machine comprising a frame carrying a vertically movable hammer head, means for causing reciprocation of said hammer head comprising a crank shaft, connecting rod and drive pulley, a continuously operating motor having a driving member, an idler pulley, means to bring said idler pulley into driving engagement with said driving member and with said drive pulley and means associated with said pliers in a position to be actuated without removing the hand therefrom for controlling the position of said idler pulley.

8. In a machine for nailing material, in combination, pliers adapted to grip the material and a nailing machine associated therewith, said nailing machine comprising a frame carrying a vertically movable hammer head, means for causing reciprocation of said hammer head comprising a hammer actuating drive shaft and eccentric, a connecting rod, a continuously operating motor having a motor shaft, a clutching or engaging mechanism adapted for driving engagement between the motor shaft and the hammer actuating drive shaft, a lever mounted on said pliers in a position to be actuated without removing the hand therefrom and a linking mechanism connecting the lever and said clutching and engaging mechanism for bringing the same into driving engagement with said motor shaft and said hammer actuating drive shaft for causing actuation of said hammer head.

9. In a machine for stretching and nailing material, in combination, pliers adapted to grip the edge of the material and a nailing machine associated therewith, said nailing machine comprising a frame carrying a vertically movable hammer head, means for causing reciprocation of said hammer head comprising a crank shaft, connecting rod and drive pulley, a continuously operating motor having a driving member, an idler pulley, a lever mounted on said pliers in a position to be actuated without removing the hand therefrom and a cable connecting said lever with said idler pulley for bringing the same into driving engagement with said driving member and with said drive pulley for causing actuation of said hammer head.

10. A nailing machine comprising a frame carrying a vertically movable hammer head, feeding means for feeding a nail in proximity to the hammer head each time the hammer head is in raised position and means for causing reciprocation of said hammer head comprising a hammer actuating drive shaft and eccentric, a connecting rod, a continuously operating motor having a motor shaft, a clutching or engaging mechanism adapted for driving engagement between the motor shaft and hammer drive shaft, means associated with said hammer reciprocation means arranged to normally bring the mechanism to rest with the hammer head in a raised position after the nail has been driven.

11. In a machine for stretching and nailing material, in combination, pliers adapted to grip the edge of the material and a nailing machine associated therewith, said nailing machine comprising a frame carrying a vertically movable hammer head, means including a drive pulley for actuating said hammer head, a continuously operating motor and means to make periodic driving connection between said motor and said actuating means, said drive pulley having a counterweight associated therewith and arranged to normally bring the mechanism to rest with the hammer head in raised position.

12. A nailing machine comprising a frame carrying a reciprocatable, electrically magnetized hammer head, and feeding means for feeding nails into position to be magnetically attracted to said hammer head, said feeding means comprising an inclined chute terminating adjacent to the line of reciprocation of said hammer head and at a point below that of the raised position of the hammer head whereby the nail upon leaving the chute is attracted to the hammer head.

13. A nailing machine comprising a frame carrying a reciprocatable, magnetic hammer head, feeding means for feeding nails into position to be magnetically attracted to said hammer head, and a feed chute adapted to feed nails to said hammer head for nailing, said feed chute having a slot through which the nails extend and having a ratchet wheel at an intermediate point therein adapted to pass but one nail at a time and means associated with said hammer and ratchet wheel and actuated in synchronism with the hammer for advancing said ratchet wheel one notch at each actuation of said hammer so as to feed a nail along the balance of said chute adjacent the line of reciprocation of said hammer and at a point below that of the raised position of the hammer head whereby the nail upon leaving the chute is attracted to the hammer head.

14. In a machine for stretching and nailing material, in combination, pliers adapted to grip the edge of the material and a nailing machine associated therewith, said nailing machine comprising a framework carrying a vertically reciprocating, magnetic hammer head, and feeding means for feeding nails into position to be magnetically attracted to said hammer head, said feeding means comprising a chute terminating in a hinged gate located beneath said hammer head, said gate being adapted to be opened in response to downward movement of said hammer head to permit the hammer head and nail to pass therethrough, and being adapted to close when said hammer head is raised for receiving the next nail.

15. In a machine for nailing material, pliers adapted to grip the edge of the material and a nailing machine comprising a hammer movably associated therewith for driving a nail and a continuous feed chute adapted to feed nails to said hammer head for nailing, said feed chute having a slot, running along its entire length, through which the nails extend and also having a ratchet wheel at an intermediate point along its length and positioned to one side of the slot, said ratchet wheel being adapted to pass but one nail at a time and means associated with said hammer and ratchet wheel and actuated in synchronism with the hammer for advancing said ratchet wheel one notch at each actuation of said hammer so as to feed a nail without removal from the chute and along the remainder thereof, each time the hammer head is brought into elevated position, to the end of said chute terminating at a fixed point adjacent the line of reciprocation of said hammer head and below that of the raised position of the hammer head.

16. In a stretching and nailing machine, a reciprocating hammer, feeding and orienting mechanism comprising a hopper having a rotating disc forming the bottom thereof, a hole in the wall of said hopper through which the nails are ejected by centrifugal force, a feed chute having a slot through which the shanks of the nails pass, a ratchet wheel associated with said slot and adapted to pass one nail at a time, means actuating said ratchet wheel in synchronism with said hammer, a gate adapted to close the hole in said hopper for interrupting the feed of the nails therefrom and means for closing said gate during a part of each revolution of said ratchet wheel.

17. In a machine for stretching and nailing material, in combination, pliers adapted to grip the edge of the material, a nailing machine comprising a frame carrying a reciprocating hammer, feed means for feeding nails to said hammer, and means securing said pliers in position adjacent to said hammer, said last means comprising a pin and slot connection adapted to permit vertical movement of said pliers so that the jaws of said pliers may be passed over the nail-head after the nail has been driven the desired extent, but to retain the horizontal alignment thereof with respect to the path of the hammer head.

18. In a machine for nailing material, in combination, pliers adapted to grip the edge of the material whereby it may be stretched, said pliers having the vertical side planes of its jaws converging from one vertical side toward the other vertical side as the vertical side planes approach the gripping end to permit spacing nails closely to one another and having a vertical notch formed in the forward end thereof adapted to pass the shank of a nail, said notch being insufficient in size to permit anything other than the nail to pass through it, a nailing machine associated in substantially fixed relationship with said pliers, said nailing machine comprising a frame, a hammer head adapted to reciprocate in said frame, and means to feed nails singly to said hammer head for nailing, said means terminating in alignment with the notch in said pliers, whereby the nail is driven through said notch into the material being gripped by said pliers and at a point nearer than heretofore possible to the edge of the material.

NATHAN EISENSTEIN.